J. T. Denniston,
Harness Saddle,
No. 394, Reissued Sept. 9, 1856.
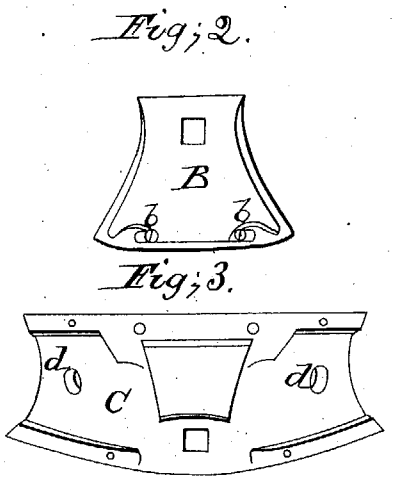
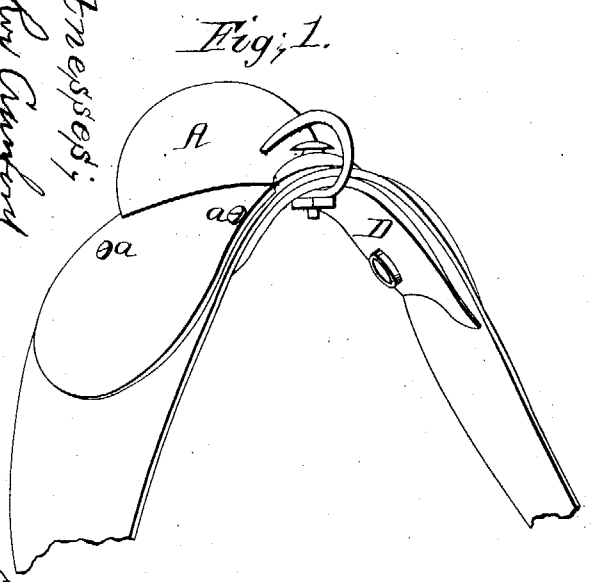
Witnesses;
Leroy Crawford
Thos Bourne
Inventor;
John T. Denniston
N. PETERS, PHOTO-LITHOGRAPHER, WASHINGTON, D. C.

UNITED STATES PATENT OFFICE.

JNO. T. DENNISTON, OF LYONS, NEW YORK.

HARNESS-SADDLE.

Specification forming part of Letters Patent No. 4,860, dated November 20, 1846; Reissued September 9, 1856, No. 394.

*To all whom it may concern:*

Be it known that I, JOHN T. DENNISTON, of Lyons, in the county of Wayne and State of New York, have invented a new and useful Improvement in the Manner of Constructing Harness-Saddles, of which the following is a full, clear, and exact description, reference being had to the accompanying drawings, making part of the said description, in which—

Figure 1 is a perspective view of the harness saddle; Fig. 2 is a view of the under side of the seat part of the saddle; and Fig. 3 is a separate view of the under part.

Prior to my said invention the general practice in manufacturing harness saddles was to make them in a manner similar to riding saddles by forming the body part, or tree, of wood strengthened by strips of iron, and in some instances a casting of iron was substituted for the wood or wood and iron trees, but in the latter case blocks of wood had to be inserted into the cast iron to admit of nailing the leather work to the tree. But in all cases the required form had to be given to the part termed the seat by leather and padding attached to the tree which could only be done by the skill of the workman, none but the best workmen being capable of making a good saddle; and in all cases the skirts and jockeys and other leather parts had to be attached by stitching at great expense.

My said invention consists in making the seat, or upper part, of metal by molding so as to give the required form, and thereby avoid the expense of labor and skill previously required in the old modes practiced prior to my invention. And my said invention also consists in making the upper part or seat and the under part or crotch so formed as to embrace between them the skirts, and the jockeys, when jockeys are used, so that the whole may be secured and held together by screws or other equivalent means, without the necessity of stitching.

The mode of application of my said invention which I have practiced is as follows: I make two castings of metal, one of which is to be placed above and termed the seat, and the other below the skirt and the jockeys, when jockeys are used. To the upper part or seat I give the form required by the mold in which it is produced, so that in making the saddle no special skill will be required of the workman. And to the under part or crotch I give any suitable form. These two parts embrace between them the portion or portions made of leather, and they are then secured together as also the leather by means of screws or other equivalent means, the upper and lower parts strengthening each other and embracing the leather skirts and the jockeys, if jockeys are used, without the necessity of stitching.

In the accompanying drawings A represents the upper part or seat which I prefer to make of cast metal of the required form which is to be given by the mold, and the surface is to receive any desirable finish, although, if desired, the outer surface may be covered with leather. The form of the under face is represented at B Fig. 2 with two or more holes tapped to receive screws *b*, *b*. The under part or crotch D is cast in one piece of the form and strength required. The under face is represented at D Fig. 1, and the upper face at C Fig. 3, and the said upper face formed to receive the leather skirt and jockeys if used, and then the upper, or saddle part, the two being secured by screws *b*, *b* which pass through the under part and leather and screwed into the upper or saddle part. In addition to all this the skirts and the jockeys, if any are used, are then further secured to the under part or crotch by screws *a a* passing through the leather and tapped into the metal. Holes are formed in the under part or crotch as at *d*, *d*, to receive the terrets, and the under part is provided with suitable padding.

By this mode of construction harness saddles can be made in half the time, and more permanent, and can be repaired with greater facility than on any other plan known prior to my invention; and they can be made to have a good appearance in the hands of ordinary workmen, while it requires the best of workmen to make harness saddles on any of the plans known prior to my invention.

I do not wish to be understood as limiting my claim of invention to the special mode herein described of constructing the parts, nor to the use of screws for connecting the upper or saddle part with the under or crotch part, as these may be modified within the range of my said invention by the substitution of equivalent means.

What I claim as my invention and desire to secure by Letters Patent is—

1. Making the upper or saddle part of harness saddles of metal, giving the required form thereof by molding, when such saddles are so formed, substantially as described, that the leather parts such as the skirts can be secured thereto without stitching, as set forth or by equivalent means.

2. And I also claim forming the upper or saddle parts and the under or crotch part in combination, so that the skirt and jockeys, if jockeys are used, will be embraced between them and secured in the manner substantially as described, or by equivalent means.

JOHN T. DENNISTON.

Witnesses:
HUGH JAMESON,
D. N. L. QUICK.

[FIRST PRINTED 1911.]